United States Patent
Van Elten

[15] 3,649,291
[45] Mar. 14, 1972

[54] PROCESS FOR THE PREPARATION OF GRANULAR, WATER-SOLUBLE, LIVESTOCK FORAGE

[72] Inventor: Gerrit J. Van Elten, Voorthuizen, Netherlands

[73] Assignee: Welvo N. V., Tromplaan, Voorthuizen, Netherlands

[22] Filed: June 26, 1967

[21] Appl. No.: 648,591

[30] Foreign Application Priority Data

June 24, 1966 Netherlands..........................6608867

[52] U.S. Cl.......................................99/2, 99/56
[51] Int. Cl..........................................A23k 1/00, A23c 1/04
[58] Field of Search..........................99/2, 56, DIG. 4, 118 P

[56] References Cited

UNITED STATES PATENTS

| | | | |
|---|---|---|---|
| 2,685,517 | 8/1954 | Dunmire | 99/11 |
| 3,432,307 | 3/1969 | Ginneken et al | 99/56 |
| 2,911,300 | 11/1959 | Peebles | 99/56 |
| 3,443,959 | 5/1969 | Ciboit | 99/56 |

FOREIGN PATENTS OR APPLICATIONS 1,403,677  6/1965  France...............................99/DIG. 4

*Primary Examiner*—Lionel M. Shapiro
*Attorney*—James P. Welch

[57] ABSTRACT

Skim milk powder and fats are separately propelled upwardly from a central bottom inlet substantially vertically by a current of air whose moisture, temperature and velocity are controlled and thence outwardly and downwardly in a surrounding airstream of lesser velocity. The milk powder and fats are brought into intimate contact while in said airstreams whereby a granular, water-soluble product suitable for livestock forage is obtained.

3 Claims, 2 Drawing Figures

PROCESS FOR THE PREPARATION OF GRANULAR, WATER-SOLUBLE, LIVESTOCK FORAGE

The invention relates to a process for the preparation of a granular product, e.g., water-soluble livestock forage, comprising a finely divided mixture of i.a., skimmed mile powder and fats substituted for milk fat, according to which process the milk powder and the liquid fats are propelled upwardly, substantially vertically by a current of air with controlled velocity, temperature and moisture in finely divided condition in a treatment vessel via a central bottom inlet, thereafter under influence of the gravity move downwardly near to the peripheral wall of the treatment vessel and during the downward movement meet a second oppositely directed inlet air current of controlled velocity, temperature and moisture, and subsequently are removed via outlets arranged all round the bottom inlets, while the fats in the vessel are solidified and the treatment air flows down via a bypass and is returned once again to the inlets, as is known from U.S. Pat. application No. 423,449, Jan. 5, 1965 now abandoned.

According to this known process the liquid fats are intimately mixed with skimmed milk powder before they are brought into the inlet. However, with this known process products can only be produced between rather narrow limits of fat content and milk powder content.

The invention aims at improving this known process such that between broader limits of milk powder content and fat content, in percentages by weight, products can be obtained which meet all requirements, especially as to the good water-solubility and the lack of caking, or hardening when stored for a long time.

According to the invention this aim is attained because the liquid fats atomized in the central inlet flow of air and powder.

These measures have as a result that the fat and powder particles are not brought into contact one with another in a mixer but in the air and the fat particles can thereby be reduced to smaller dimensions, whereby agglomerates of fat and powder particles can be formed which meet all requirements. The invention relates also to a device for the crystallization of liquids, provided with a treatment vessel having in the bottom a first central air inlet, a second air inlet coaxial therewith and all round the inlets one or more product outlets, while at the vessel an air outlet is present which is connected to the air inlets with a return conduit via a cooling plant and has a particular characteristic that means are provided to atomize liquids in the central bottom inlet.

The invention will now be elucidated with the aid of the enclosed drawing of an embodiment.

Figure 1:
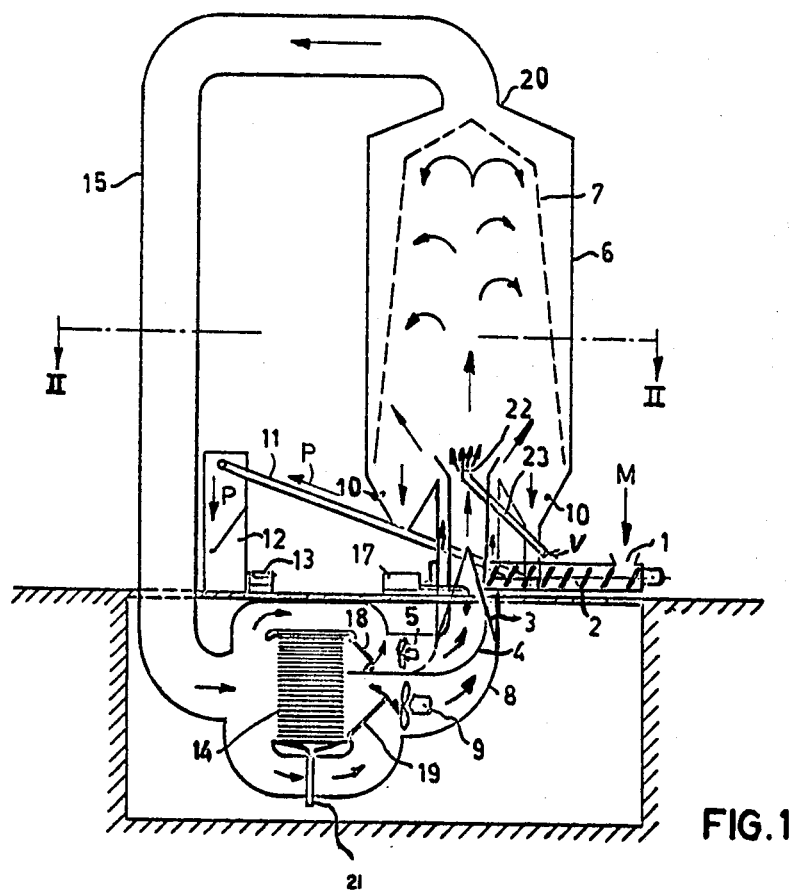
FIG. 1 shows a schematic side view of a continuously operating device according to the invention.
Figure 2:
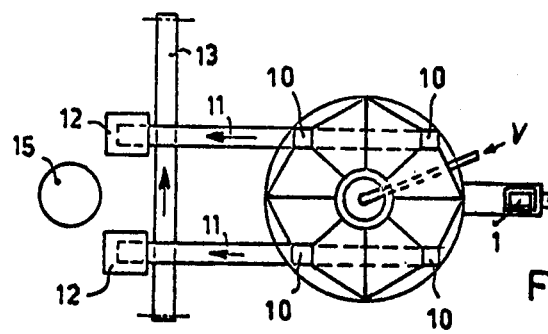
FIG. 2 shows an upper view of a cross section on the line II—II in FIG. 1.

As shown in the drawing, at M skimmed milk powder, if desired with the addition of antibiotics, hormones, vitamins or other preparations, is fed into the supply device 1, which with the aid of a schematically indicated screw conveyor 2 distributes the material over the inner conduit 4 and the outer conduit 8 via a sleeve valve system 3. These coaxial conduits 4 and 8 are centrally connected to a vertical treatment vessel 6 in which a filter 7 is present for the top outlet 20 which is connected with the inlet conduits 4 and 8 via the return conduit 15. All round the bottom inlet conduits 4 and 8 have been arranged four outlets 10 for the treated product, said outlets being connected to two transport belts 11 moving the treated product to the bag filling devices, 12, whereupon the filled bags are discharged via the transport belt 13. In the closed conduit system is present the cooler 14 through which the fans 5 and 9 suck air for the inner conduit 4 and the outer conduit 8 respectively, while for the fans 5 and 9 the valves 18 and 19 respectively have been disposed which are movable between a position in which they completely lock a bypass about the cooler or completely lock the air passage through the cooler. With this the temperature of the air can be controlled independently in both conduits. Furthermore, the metering device 17 is present, with which water can brought into each of the conduits 4 and 8 in order to control the moisture content of both currents of air. A draining 21 might be disposed under the cooler.

For the atomizing of the liquid fats a spray-nozzle 22 is disposed above the outlet of the inner conduit 4 with a supply conduit 23, with which the liquid fats can be vaporized in the inner conduit 4 in the direction of flow of the mixture of air and milk powder.

After the atomizing device 22 a contact takes place between the finely atomized fat particles and the grains of the milk powder, which are pushed up vertically and thereafter move outwardly after having come out of the influence of the current of air, whereupon near the peripheral wall of the vessel 6 they move downwardly in the direction of the outlets 10. However, before they reach these outlets they pass through a mixture of air and attendant milk powder coming from the outer conduit 8. In this way it is attained that a broader field of products can be manufactured.

EXAMPLES 1 and 2

A fat mixture from equal parts coconut oil, palm kernel oil and molten beef suet with addition of 5 percent lecitin as emulsifier was sprayed at a temperature of 45° C. under 120 atmosphere overpressure through a nozzle with a diameter of 0,8 mm. At an air velocity of 5 m./sec. in the inner conduit 4 the atomizer cone had a diameter of 20 cm., while also the inner conduit had a diameter of 20 cm. The velocity of the air in the outer conduit with an outer diameter of 35 cm. was 12 m./sec. The temperature of the untreated powder was 15° C. This milk powder was brought into the vessel for 60–70 percent through the inner conduit and for 40–30 percent through the outer conduit.

| | A | B |
|---|---|---|
| Temperature of the air | –20° C. | –2° C. |
| Temperature of the final product | 0° C. | +10° C. |
| Appearance | very fine | coarse sawdust like |
| Solubility | good | very quick |
| Sticking effect | moderate | practically absent |
| Diameter fat particles | 20–30μ | 20–30μ |

In both cases the fat amounted to 20 percent by weight of the powder.

What is claimed is:

1. A process for preparing a water-soluble, granular, livestock forage from finely divided skimmed milk powder and fats of a milk substitute, the steps comprising feeding skimmed milk powder at a first zone and fats at a second zone into the central airstream of a two-part airstream in which said airstreams have a controlled velocity, temperature and moisture content, propelling said skimmed milk powder and said fats upwardly in said central portion of said airstream with said air flowing therein and, thereafter, moving said skimmed milk powder and said fats downwardly and outwardly through the portion of the airstream surrounding said central portion, while said milk powder and said fats are moving upwardly through said central portion of said airstream and downwardly through said surrounding portion, bringing said milk powder and said fats into intimate contact with each other and forming said milk powder and said fats into a granular product, collecting said granular product that falls downwardly and outwardly through said surrounding portion and recycling said air.

2. A process as recited in claim 1 in which said skimmed milk powder and said fats are combined, mixed and said fats are crystallized on said skimmed milk powder particles as said skimmed milk powder and said fats move downwardly in said surrounding airstream.

3. A process as recited in claim 2 in which a portion of said skimmed milk powder is fed into said central airstream and the remaining portion of said skimmed milk powder is fed into the surrounding airstream.

* * * * *